United States Patent [19]

Cowman, Jr. et al.

[11] 4,115,486

[45] Sep. 19, 1978

[54] METHOD OF DEVELOPING AN ANTICLASTIC CONCENTRATOR

[75] Inventors: Charles D. Cowman, Jr., St. Paul, Minn.; John P. G. Shepherd, River Falls, Wis.

[73] Assignee: Minnesota Mining and Manufacturing Company, St. Paul, Minn.

[21] Appl. No.: 790,581

[22] Filed: Apr. 25, 1977

Related U.S. Application Data

[62] Division of Ser. No. 560,541, Mar. 20, 1975, Pat. No. 4,035,064.

[51] Int. Cl.$^2$ .................... B29D 11/00; B29C 17/02
[52] U.S. Cl. ........................ 264/1; 264/134; 264/230; 264/285; 264/339; 264/342 R
[58] Field of Search ............... 264/1, 2, 230, 342 R, 264/339, 28 S, DIG. 71, 291, 134

[56] References Cited

U.S. PATENT DOCUMENTS

| Re. 25,202 | 7/1962 | Clopp et al. ................. 264/339 |
| 3,206,895 | 9/1965 | DeRidder et al. ............. 52/15 |
| 3,574,447 | 4/1971 | Ruble .......................... 350/293 |
| 3,739,455 | 6/1973 | Alvarez ........................ 264/1 |

OTHER PUBLICATIONS

Burwell, "RCA Technical Notes", TN No. 774, Sep. '68, pp. 1-3.

*Primary Examiner*—James B. Lowe
*Attorney, Agent, or Firm*—Cruzan Alexander; Donald M. Sell; John C. Barnes

[57] ABSTRACT

Devices for concentrating radiant energy and having reflective anticlastic surfaces, produced by processes involving shrinking an elastic reflective film onto a rigid frame representing one or a series of twisted squares, or by twisting a semi-rigid elastic reflective panel.

4 Claims, 5 Drawing Figures

METHOD OF DEVELOPING AN ANTICLASTIC CONCENTRATOR

This is a division of application Ser. No. 560,541 filed Mar. 20, 1975 now U.S. Pat. No. 4,035,064.

This invention relates to stable structures having an anticlastic surface. There is disclosed a novel method for developing such surfaces, as well as novel articles possessing unit or modular surface areas of corresponding anticlastic characteristics. The invention most particularly relates to structures having specularly reflective anticlastic surfaces and with which useful concentrations of solar radiation are obtainable. In one specific aspect, the invention relates to solar energy concentrators having improved ability to shed rainwater, and having an accurately defined surface contour while requiring minimal support structure. The structures are useful also as directive reflectors, using a linear or point source.

PRIOR ART

Solar energy concentrators employing elongate trough-like reflectors of parabolic cross-section provide an effective line focus but require heavy support structure and when exposed to the weather have a tendency to retain rainwater and thus lose efficiency under conditions of intermittent rainfall. The problem is further amplified in circular parabolic bowl-shaped reflectors.

U.S. Pat. No. 3,206,895 describes a roof structure having a hyperbolic paraboloidal contour and constructed of parallel narrow panels of extruded aluminum which are slid together over a temporary support. There is no suggestion of light reflection or focusing, and none of forming a continuous smooth reflective surface and particularly one prepared from a single unitary web.

U.S. Pat. No. 3,574,447 describes a collapsible multicurved reflector suitable for deployment in space and composed of an energy-reflective web, e.g., a solid wire grid, supported at spaced peripheral points from a framework of radiating resilient spokes. Such incomplete and resilient support results in an unstable, poorly defined and inefficient structure, unsuitable for concentration of solar radiation.

THE INVENTION

The novel method of the present invention involves bringing to a condition of minimum surface area a specularly reflective elastic web affixed to a support representing longitudinally spaced elongate rigid support members angularly offset about their mutual axis, while avoiding contraction at the sides of said web. The resulting anticlastic surface is capable of concentrating sunlight along a linear focus. A plurality of such surfaces may be combined with overlapping collinear foci, e.g., for concentration of sunlight along a linearly extended receptor. Alternatively, the surface may be modified to provide still greater increase in concentration of radiant energy.

In one form of the invention, a heat-contractile reflective thin plastic film is smoothly attached to a rigid closed twisted frame and is then cautiously heated to cause the film to shrink. In another form, a semi-rigid reflective elastic flat panel is supported across the ends between spaced clamps which are then twisted from the plane of the panel and secured in that position. In both instances, the reflective surface is anticlastic, being substantially a hyperbolic paraboloidal surface.

The resulting structure may itself serve for directing or concentrating radiant energy onto an energy converting medium. Alternatively, it may serve as a pattern for second or later generation end products. For example, the anticlastic shape may be reproduced in a rigid body by methods involving hardening of liquid resin placed in contact with the curved surface and subsequent reflectorizing of the hardened shaped resin surface, or by plating, casting or stamping of specularly reflective metal or other structural material from rigid forms similarly fashioned to provide rigid bodies having anticlastic surfaces providing a linear or spot focus.

THE DRAWINGS

The present invention will now be further described and illustrated in connection with the appended drawing, wherein:

FIG. 1 is a view in perspective of one form of the radiation concentrating device of the invention, FIGS. 2 and 3 illustrate the focusing properties of the radiation concentrator modules of FIG. 1, FIG. 4 represents an alternative supporting frame structure, and FIG. 5 illustrates a modified structure providing a point focus.

DETAILED DESCRIPTION

Figure 1:
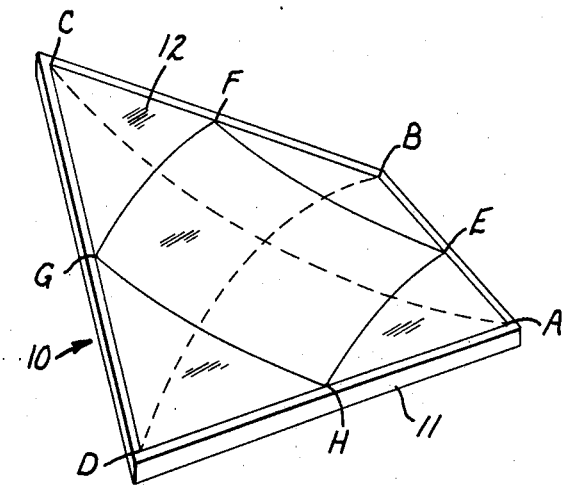

The device 10 of FIG. 1 comprises a rigid closed frame 11, initially a flat rectangle which has been twisted or skewed, e.g., by lifting the corner A from the plane of the three remaining corners, B, C, D. To the frame is affixed a thin elastic heat-shrinkable web 12 having a specularly reflective surface and which has been heated so as to be constricted to a condition of minimum surface area, thereby assuming an anticlastic configuration as represented by the diagonals AC and BD and by lines EF, FG, GH and HE generally parallel thereto.

Figure 2:
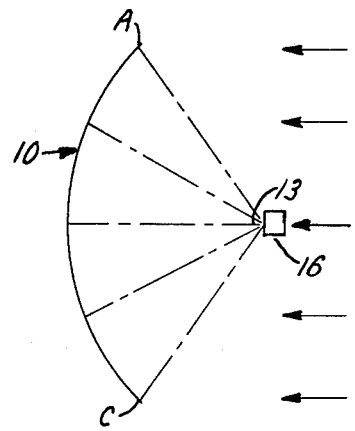
Figure 3:
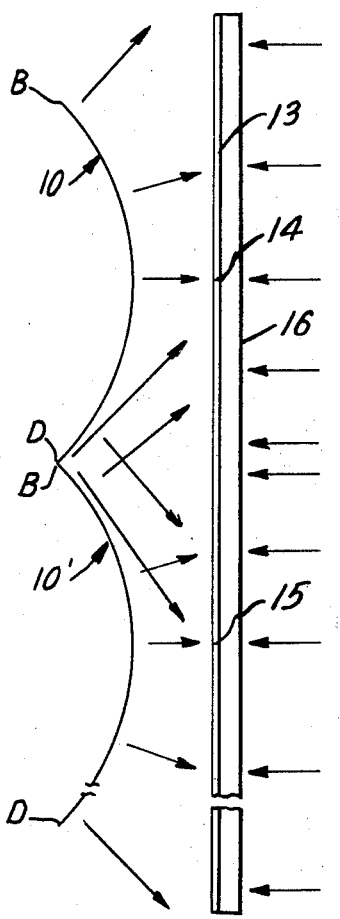

Radiation directed parallel to a central perpendicular against the reflective hyperbolic paraboloidal surface 12 of the device as shown in FIG. 1 is reflected and brought to a focus along a line 13 as indicated in FIGS. 2 and 3. FIG. 2 shows the position of the focus with respect to the concave curvature of diagonal AC, whereas FIG. 3 illustrates the focus, (with the width dimension indicated as viewed from the direction of the source) obtained along the convex curvature BD, in this case for two or more juxtaposed modules 10, 10'. The length of the narrow linear focus 13 may be shown to be greater by one diagonal than the sum of the diagonals of the several square modules. The energy reflected from adjacent modules overlaps between their midpoints (14, 15) to provide increased intensity along all but the terminal portions of the focal area 13.

Figure 4:
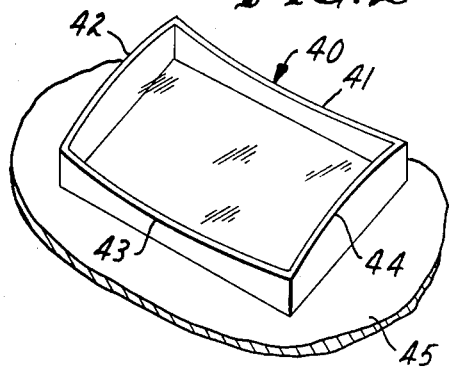

The same anticlastic surface characteristics are obtainable by affixing the reflective film over a rigid framework 40 which may be supported on a base 45 as illustrated in FIG. 4, and wherein the exposed edges of the four frame members 41–44 are initially curved to match the curvature of lines EF, FG, GH and HE of FIG. 1. These curved exposed edges thus may be considered to represent the twisted rigid closed frame 11 of FIG. 1. Frames of other shapes but with edges following the contours of the surface 12 may analogously be developed.

The linear focus of the concentrators 10 and 10' of FIGS. 2 and 3 may, as illustrated, be disposed along a linearly extended receptor 16 as shown in block diagram form for an energy converting medium which will absorb the concentrated radiant energy.

Instead of affixing the film to a previously twisted rigid frame and then heat-shrinking, it is alternatively possible to twist and rigidify the frame after first stretching and applying the suitably elastic film. Minimum surface area and an anticlastic configuration are achieved during twisting of the frame, by virtue of the elasticity of the film.

Most effective concentration of incident radiation is accomplished with arrays of substantially square panels, aligned such that their overlapping foci are collinear; but panels of other shapes, including rectangular and multi-lateral or circular, may also be used. Rectangular panels having a length to width ratio of two are substantially as effective in such arrays as are square panels, but the effectiveness, as determined in terms of concentration of solar energy, diminishes rapidly as the ratio is increased to or beyond three. For solar concentrators having an initially rectangular shape, the maximum useful length to width ratio may be estimated from the formula 90/T wherein T signifies the specific twist angle, i.e., the twist angle in degrees between the opposing edges of a twisted square segment of the panel. For a rectangle of length L and width W, specific twist angle is therefore the relative angle between the two ends, divided by the factor L/W.

Reflectivity is most conveniently attained by metallizing or otherwise treating the film prior to affixing it to the frame, but reflective coatings may alternatively be applied to the final curved surface providing the conditions required do not cause distortion of the film.

The structure and method just described make possible the formation of anticlastic surfaces having desirably short focal lengths and with relatively inexpensive thin films. Another structure requires much thicker semirigid webs and results primarily in longer focal lengths, but makes possible structures with which the focal length may be easily varied, and others with which the reflected rays may be brought to substantially a point focus.

The thick semi-rigid web or panel of elastic material is supported between rigid support members analogous to frame elements AD and BC of FIG. 1 which are then uniformly oppositely angularly offset by twisting about their common axis and rigidly retained in the twist position. The degree of twist imparted is not greater than that required to produce a specific twist deformation of approximately twice the thickness of the panel and in any event is less than that amount which would cause localized folding or creasing of the panel rather than development of a smooth anticlastic surface.

Within the indicated limitation, the rigidity of the panel is sufficient to maintain full panel width between the unsupported side edges, the panel edges defining substantially straight lines connecting the corresponding ends of the rigid support members.

Specific twist deformation is here defined as the deflection at each corner of the twisted square panel or segment from the original plane of the flat untwisted panel. For the usual small twist angles, deformation may be determined more easily and substantially as accurately by measuring the vertical distance to any given corner of the square from the plane of the other three corners, the value thus obtained being approximately four times the specific twist deformation.

The focal lengths of continuous hyperbolic paraboloidal reflectors made from smooth-surfaced semi-rigid elastic panels may be altered if desired, by simply altering, within the specified limits, the amount of relative twist or angular offsetting given the rigid end supports.

Figure 5:
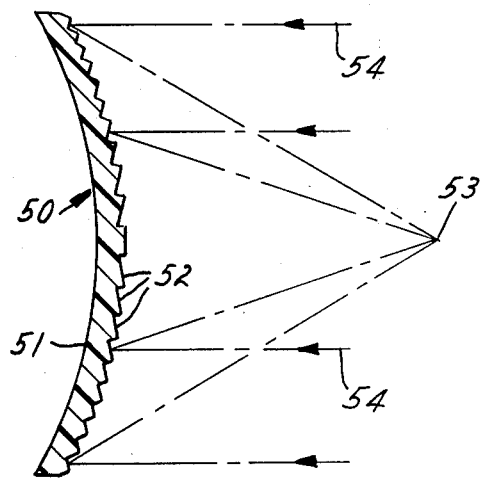

FIG. 5 illustrates a cross-section, taken along a convex parabolic diagonal corresponding to line BD of FIG. 1, of a modified semi-rigid anticlastic concentrator with which the incident radiation is brought to substantially a point focus.

The irradiated forward surface of the panel 50 is illustrated as being provided with an incremental reflector pattern of linear elements 52. These elements are linearly each perpendicular to the diagonal BD of FIG. 1 and when disposed in the convex parabolic shape illustrated are sloped to reflect the parallel incoming rays 54 toward a focus 53. The combination of the slope of the elements and the over-all curvature of the panel results in the focusing of the incident rays at or very near a focal point 53.

The linear incremental reflector elements are conveniently formed in the initially flat panel 51, e.g., by gouging or molding followed by metallizing. The slope of the elements may be formed so as to focus radiation incident on said flat panel at a selected focal length F; the focal length of the same panel when twisted sufficiently to obtain minimum image area at the focal point 53 is then found to be 2F.

EXAMPLES

The following specific examples will further illustrate, without limiting, the practice of the invention:

EXAMPLE 1

Biaxially oriented ethylene glycol terephthalate polyester film of nominal thickness of 0.081 mm. is reflectorized over one surface by vacuum deposition of aluminum. The reflective metallized film is smoothly applied over a rigid twisted square framework of 12.7 mm. aluminum angle stock 31.8 cm. on each side and which is twisted to an angle of 20.9° between opposing end frame members; i.e., each corner is 11.1 cm. from the plane of the other three. The film is rigidly affixed to the frame using high strength heat-resistant adhesive tape.

The assembly is placed in an oven maintained at 200°–230° C. and held there for 15 seconds. The film contracts to minimum surface area and assumes an anticlastic configuration.

The assembly is supported in such a position that a beam of sunlight is incident on the reflective surface. The reflected beam focuses as a narrow line on a transparency held at a distance of 45.7 cm. in front of the reflective surface. The concentration at the focus, determined as the ratio of the reflector area to the area of the concentrated beam at the focus as determined visually is approximately 20.

The assembly may alternatively be used to reflect light, from a line source placed at the focus, in a directed beam.

EXAMPLE 2

Another reflector prepared as described under Example 1 but with a framework 63.5 cm. on each side and twisted at an angle of 22.1 degrees between opposing frame members, i.e., with each corner deflected a distance of 23.5 cm. from the plane of the other three, exhibits a focal length of 81.2 cm. By visual inspection, the area of the reflected beam at the focus is found to measure 180 × 0.8 cm., indicating a concentration of 28.

EXAMPLE 3

A series of four reflectors each as described under Example 1, except that the reflective surface of each measures 10.2 cm. along each side and each frame has a twist angle of 7.6° between opposite sides, is assembled with the corners at the ends of their convex diagonals along a common line, the total length of the array being 58.4 cm. The assembly is exposed to sunlight parallel to the central perpendiculars. The focal length is 38.1 cm. The concentrated beam at the focus covers an area of 0.32 × 72.8 cm., providing a concentration factor of approximately 18.

EXAMPLE 4

Semi-rigid rectangular flat plates of various elastic materials are reflectorized or polished. They are supported across their ends between parallel rigid clamps and are then twisted by opposite rotation of the clamps about their common axis and with minimal axial tension applied, to a point at which axial contraction first becomes apparent. The angle of twist between the clamps is measured and the specific twist angle determined. Specific twist deformation is calculated from the specific twist angle and is found to be not significantly greater than twice the thickness of the plate in each instance. Results are as tabulated:

| Material | Dimensions, cm | Sp. Twist Angle, Deg. | Sp. Twist Deform, cm. | Focal Length cm. |
| --- | --- | --- | --- | --- |
| "Plexiglass" | 47.1 × 15.2 × .159 | 4.67 | .31 | 93.5 |
| "Plexiglass" | 47.1 × 10.2 × .159 | 7.33 | .325 | 39.6 |
| "Plexiglass" | 47.1 × 15.2 × .265 | 8 | .53 | 55.1 |
| Aluminum | 6.66 × 5.1 × .089 | 8.1 | .18 | 18.0 |

EXAMPLE 5

A strip of "Plexiglass" polymethylmethacrylate paneling of 1.59 mm. thickness is reflectorized over one surface and supported between rigid clamps, rotatable about the axis of the strip, to provide a reflective rectangular segment measuring 47.1 × 10.2 cm. The clamps are rotated in opposite directions to indicated angular displacement between the two, and the focal length, i.e., the distance from the center of the surface at which sunlight incident on the surface is brought to a linear focus, is determined for each position. The area of the focused beam is determined by estimation of its length and width at the focus and the concentration determined as the inverse ratio of such area to the area of the reflective strip, with the following tabulated results.

| Angular Rotation Degrees | Focal Length cm. | Image Width cm. | Concentration |
| --- | --- | --- | --- |
| 15 | 83.8 | .79 | 7.9 |
| 20 | 63.5 | .64 | 9.8 |
| 25 | 50.8 | .48 | 12.6 |
| 30 | 41.9 | .40 | 14.9 |

EXAMPLE 6

A flat Plexiglass panel is provided over one surface with a series of parallel linear ridges extending from side to side. The panel is 27.9 cm. on each side and 0.06 cm. in thickness. There are 20 ridges per cm. and the surfaces of the ridges are angled to reflect sunlight incident on the panel to a focal line in front of the central ridge and at a distance of 25 cm. The ridged surface is reflectorized by vapor coating with aluminum.

Two opposite corner segments of the panel are removed, leaving a central doubly pointed segment 15 cm. in width and almost 40 cm. in length, and with the grooves at an angle of 45° to the longitudinal axis. The segment is adherently bonded onto a Plexiglass support strip measuring 55 × 15 × 0.265 cm. which is held between rotatable rigid clamps mounted 46 cm. from each other. The clamps are rotated to an angular displacement of 25° to convert the initially flat ridged surface into an anticlastic or hyperbolic paraboloidal surface configuration and with the ridges aligned perpendicularly to the convex diagonal.

Sunlight incident on the anticlastic surface is found to be focused at a central spot measuring 1.6 × 3.2 cm. and at a distance of 50.8 cm. in front of the panel.

What is claimed is as follows:

1. Method of developing a rigid continuous hyperbolic paraboloidal anticlastic surface comprising affixing a specularly reflective elastic web to the sides and ends of a rigid closed frame, said sides and ends comprising spaced elongate rigid supports angularly offset about their mutual axes, and applying a force to said web between said supports by means for contracting said web to bring said web to a condition of minimum surface area between said supports.

2. Method of claim 1 wherein said means applying said force to said web is by heat shrinking.

3. Method of developing a rigid continuous hyperbolic paraboloidal anticlastic surface comprising producing a specularly reflective surface on one face of a semi-rigid rectangular flat elastic web of sufficient thickness and rigidity to prevent lateral contraction, supporting said web at opposite ends, and angularly displacing said ends to impart a specific twist deformation to said web wherein the specific twist deformation is not greater than twice said thickness.

4. Method of claim 3 wherein said twist deformation is obtained by opposite rotation of said ends about their common axis.

* * * * *